(12) United States Patent
Sasaki et al.

(10) Patent No.: US 6,287,680 B1
(45) Date of Patent: Sep. 11, 2001

(54) POROUS POLYESTER FILM

(75) Inventors: Yasushi Sasaki; Akira Takahashi; Koji Yamada, all of Ohtsu (JP)

(73) Assignee: Toyo Boseki Kabushiki Kaisha, Osaki (JP)

( * ) Notice: Subject to any disclaimer, the term of this patent is extended or adjusted under 35 U.S.C. 154(b) by 0 days.

(21) Appl. No.: 09/456,977

(22) Filed: Dec. 7, 1999

(30) Foreign Application Priority Data

Dec. 8, 1998 (JP) .................................................. 10-348973

(51) Int. Cl.[7] .............................. B32B 5/18; B32B 27/20; B32B 27/36
(52) U.S. Cl. ....................... 428/317.9; 428/327; 428/480; 428/910; 525/165; 525/177
(58) Field of Search .............................. 428/304.4, 315.5, 428/315.7, 317.9, 318.4, 319.3, 323, 327, 480, 910; 525/165, 177

(56) References Cited

U.S. PATENT DOCUMENTS 5,698,489  12/1997  Shiral et al. ..................... 503/227

FOREIGN PATENT DOCUMENTS

| 0 248 600 | 12/1987 | (EP) . |
|---|---|---|
| 0 934 969 | 8/1999 | (EP) . |
| 09-149576 | 6/1997 | (JP) . |
| 09-286867 | 11/1997 | (JP) . |
| 11-092577 | 4/1999 | (JP) . |

Primary Examiner—Vivian Chen
(74) Attorney, Agent, or Firm—Foley & Lardner (57) ABSTRACT

A porous polyester film comprising a composition comprising a polyester resin and a thermoplastic resin incompatible with the polyester resin, and a number of voids formed by dispersing the incompatible thermoplastic resin to provide particles in the polyester resin and stretching same, wherein the incompatible thermoplastic resin comprises a polyolefin resin, and the film satisfies the following requirements (a) to (c):

(a) an apparent specific gravity of not more than 1.3;
(b) an average size d of dispersed particles of the polyolefin resin of not more than 15 μm; and
(c) a ring crush strength G (unit:kg/mm) and a film thickness t (unit:mm) satisfying the following formula $$G > 15 \times t^3$$

is provided. According to the invention, a film having superior properties derived from a porous structure (e.g., cushioning property, low dielectric property, light weight) and good handling property.

12 Claims, 3 Drawing Sheets

POROUS POLYESTER FILM

TECHNICAL FIELD OF THE INVENTION

The present invention relates to a porous polyester film having superior properties (e.g., cushioning property, low dielectric property, light weight) derived from a porous structure and good post-processing handling property. More particularly, the present invention relates to a porous polyester film suitable as an electric insulating material, which shows superior low dielectric property and good handling property (e.g., mounting property), and a porous polyester film suitable for various printing applications, which shows superior cushioning property and good handling property (e.g., easy transport of film).

BACKGROUND OF THE INVENTION

A synthetic paper obtained from a starting material mainly containing a synthetic resin has been developed for various applications in view of its superior water resistance, surface gloss, printability of a smooth surface and the like. Particularly, a polyester resin represented by polyethylene terephthalate has high heat resistance and high rigidity among the starting materials for synthetic paper, and has been employed in a wider range of uses. For example, utilizing the low dielectric property derived from a porous structure, it has been used as an insulating material for electric motors (JP-A-9-149576). In addition, utilizing the cushioning property due to the porous structure, it has been used as various printing films for heat transfer printing (U.S. Pat. No. 4,912,085).

For the production of a porous polyester film to be used for such applications, there have been known a method comprising adding inorganic fine particles to a polyester resin, followed by stretching to form voids around the particles, and a method comprising mixing a polyester resin with a thermoplastic resin incompatible with the polyester resin and the like to allow for dispersion of the thermoplastic resin in particles in the polyester resin, followed by stretching to form voids around the particles. Particularly, the latter has been widely used since the film can be made lighter.

The thermoplastic resin (hereinafter also referred to as a void-forming agent), to be used for this void-forming and which is incompatible with the polyester resin, includes polyolefin resin represented by polypropylene and polymethyl pentene (JP-A-49-34755), and a polystyrene resin (JP-B-49-2016, JP-B-54-2955).

Of these, a polyolefin resin, particularly polymethylpentene, has superior void-forming capability, thereby allowing formation of voids inside the film with high efficiency. On the other hand, fine dispersion in the polyester resin is difficult and is susceptible to the formation of coarse and non-uniform voids, which in turn results in lower flexibility (i.e., following capability of a film upon deformation) of a film, to markedly degrade the handling property of the film. To be specific, difficult punch cutting, poor performance during being transported, and poor machine insertion applicability (mounting property) may be found when the film is used as an insulating material for electric motors. These problems are solved only when the porosity of the film is limited to a certain level, which requests sacrificing the properties (e.g., cushioning property, low dielectric property and light weight) derived from a porous structure.

The degraded handling property poses problems when used as the above-mentioned electric insulating material, and in terms of transportability (failure in paper supply, jamming of paper and the like), printing failure on wrinkles and the like in high speed handling for various printing methods. To solve these problems, it is again necessary to limit the porosity, sacrificing the properties (e.g., cushioning property, low dielectric property and light weight) derived from a porous structure.

In contrast, when a polystyrene resin is used as a void-forming agent, fine dispersion in the polyester resin is more easily achieved than when a polyolefin resin is used, and the handling property of a film becomes strikingly superior. However, a polystyrene resin has a lower void-forming capability than a polyolefin resin, and the properties (e.g., cushioning property, low dielectric property and light weight) derived from a porous structure cannot be fully expressed.

There have been made some attempts to provide for fine dispersion of a polyolefin resin (e.g., polymethylpentene) in a polyester resin. For example, the use of a surfactant (JP-B-7-17779), polyethylene glycol (JP-A-2-235942), polyether ester copolymer (JP-A-4-264141) and the like has been proposed.

The proposed use certainly reduces coarse and non-uniform voids and improve flexibility of a film to a certain degree, somewhat improving handling property of a film. However, the method including the use of a surfactant causes high adhesion between a polyester resin and a polyolefin resin (e.g., polymethylpentene), which inhibits formation of voids upon stretching. In addition, the method including the use of polyethylene glycol and a polyether ester copolymer significantly impairs the rigidity (nerve) inherently possessed by a polyester film, because these components act as plasticizers to the polyester resin. The lower rigidity conversely degrades handling property of a film. Moreover, the ether component is easily oxidized to cause coloring of a film and sometimes promotes degradation of a polyester resin.

According to the prior art technique as described above, a film having both the superior properties (e.g., cushioning property, low dielectric property and light weight) derived from a porous structure and good handling property has not been obtained.

SUMMARY OF THE INVENTION

It is therefore an object of the present invention to overcome the defects of the above-mentioned prior art technique and to provide a film having both the superior properties (e.g., cushioning property, low dielectric property and light weight) derived from a porous structure and good handling property.

The present invention provides the following.

(1) A porous polyester film comprising a composition comprising a polyester resin and a thermoplastic resin incompatible with the polyester resin (hereinafter to be also referred to as an incompatible thermoplastic resin), and a number of voids formed by dispersing the incompatible thermoplastic resin to provide particles in the polyester resin and stretching same, wherein the incompatible thermoplastic resin comprises a polyolefin resin, and the film satisfies the following requirements (a) to (c):

(a) an apparent specific gravity of not more than 1.3;

(b) an average size d of dispersed particles of the polyolefin resin of not more than 15 μm; and (c) a ring crush strength G (unit:kg/mm) and a film thickness t (unit:mm) satisfying the following formula $$G > 15 \times t^3$$

(2) The porous polyester film of (1) above, wherein the dispersed particles of the incompatible thermoplastic resin have an aspect ratio of the section parallel to the longitudinal direction of the film of 1–10.

(3) The porous polyester film of (1) above, having a buckling radius r (unit:mm) to be defined in the specification and a film thickness t (unit:mm), that satisfy the following formula:

$$r < 25 \times t$$

(4) The porous polyester film of (1) above, having a dielectric constant of less than 2.9.

(5) The porous polyester film of (1) above, wherein the polyolefin resin is polymethylpentene and/or polypropylene.

(6) The porous polyester film of (5) above, further comprising a polystyrene resin as the incompatible thermoplastic resin.

(7) The porous polyester film of (6) above, wherein the film has a polystyrene resin content (a wt %), a polymethylpentene content (b wt %), and a polypropylene content (c wt %), which satisfy the following formulas:

$$0.01 \leq a/(b+c) \leq 1 \, c/b \leq 1$$

$$3 \leq a+b+c \leq 20$$

(8) The porous polyester film of (1) above, wherein the polyester resin has a cyclic trimer content of not more than 0.5 wt % of the whole weight of the film.

(9) The porous polyester film of (8) above, which is used as an insulating material for an electric motor.

(10) The porous polyester film of (8) above, wherein the polyester resin has an intrinsic viscosity of 0.68–1.0 dl/g.

(11) The porous polyester film of (8) above, wherein the polyester resin shows an increase in the amount of a cyclic trimer of not more than 0.50 wt % upon melting at 290° C. for 60 minutes.

(12) The porous polyester film of (8) above, wherein the polyester resin has been subjected to a water treatment in the state of chips after condensation polymerization, and the polyester resin is obtained mainly from an aromatic dicarboxylic acid or an ester-forming derivative thereof and ethylene glycol as starting materials and by the use of a Ge compound and/or a Ti compound as catalyst(s).

DETAILED DESCRIPTION OF THE INVENTION

The polyester resin in the present invention is preferably a crystalline polyester resin mainly comprising an aromatic dicarboxylic acid component and a glycol component. It is more preferably a polyester resin comprising an aromatic dicarboxylic acid component in a proportion of not less than 85 mol % of the total acid component, particularly preferably a polyester resin comprising an aromatic dicarboxylic acid component in a proportion of not less than 90 mol % of the total acid component.

The aromatic dicarboxylic acid component constituting the aforementioned polyester resin is exemplified by aromatic dicarboxylic acid, such as terephthalic acid, 2,6-naphthalenedicarboxylic acid, diphenyl-4,4'-dicarboxylic acid, diphenoxyethanedicarboxylic acid and the like, ester-forming derivatives thereof and the like.

The glycol component constituting the aforementioned polyester resin is exemplified by aliphatic glycol, such as ethylene glycol, trimethylene glycol, tetramethylene glycol and the like; alicyclic glycol, such as cyclohexanedimethanol; and the like.

The acid component other than the above-mentioned, which may be copolymerized to form the aforementioned polyester resin is exemplified by aromatic dicarboxylic acid, such as isophthalic acid and the like and ester-forming derivatives thereof; oxy acid, such as p-hydroxybenzoic acid, oxycapronic and the like and ester-forming derivatives thereof; aliphatic dicarboxylic acid, such as adipic acid, sebacic acid, succinic acid, glutaric acid, dimer acid and the like and ester-forming derivatives thereof; alicyclic dicarboxylic acid, such as 1,4-cyclohexanedicarboxylic acid, 1,3-cyclohexanedicarboxylic acid and the like and ester-forming derivatives thereof; and the like.

The glycol component other than the above-mentioned, which may be copolymerized to form the aforementioned polyester resin is exemplified by aliphatic glycol (e.g., diethylene glycol, neopentyl glycol and the like), aromatic glycol (e.g., bisphenol A, alkylene oxide adduct with bisphenol A and the like), polyalkylene glycol (e.g., polyethylene glycol, polybutylene glycol and the like), and the like.

A polyfunctional compound such as trimellitic acid, trimesic acid, pyromellitic acid, tricarballylic acid, glycerol, pentaerythritol, trimethylolpropane and the like may be copolymerized as long as the polyester resin is substantially linear. In addition, monofunctional compound such as benzoic acid, naphthoic acid and the like may be copolymerized.

A preferable example of the aforementioned polyester resin is that mainly consisting of ethylene terephthalate unit, more preferably a linear polyester resin comprising an ethylene terephthalate unit in a proportion of not less than 85 mol %, particularly preferably a linear polyester resin comprising an ethylene terephthalate unit in a proportion of not less than 90 mol %.

Another preferable example of the aforementioned polyester resin is that mainly consisting of ethylene 2,6-naphthalate unit, more preferably a linear polyester resin comprising an ethylene 2,6-naphthalate unit in a proportion of not less than 85 mol %, particularly preferably a linear polyester resin comprising an ethylene 2,6-naphthalate unit in a proportion of not less than 90 mol %.

The aforementioned polyester resin, particularly that mainly consisting of ethylene terephthalate unit preferably has an intrinsic viscosity of 0.50–1.30 dl/g, more preferably 0.55–1.20 dl/g, most preferably 0.60–0.90 dl/g. When the intrinsic viscosity is less than 0.50 dl/g, the obtained film may show poor mechanical property. When it exceeds 1.30 dl/g, the resin temperature becomes high during melt-extrusion and a thermal decomposition becomes active, which in turn may cause problems in that free low molecular weight compounds, such as cyclic trimer, increase and a film is colored yellow and the like.

The aforementioned polyester resin, particularly that mainly consisting of ethylene 2,6-naphthalate unit preferably has an intrinsic viscosity of 0.40–1.00 dl/g, more preferably 0.42–0.95 dl/g, most preferably 0.45–0.90 dl/g. When the intrinsic viscosity is less than 0.40 dl/g, the obtained film may show poor mechanical property. When it exceeds 1.00 dl/g, the resin temperature becomes high during melt-extrusion and a thermal decomposition becomes active, which in turn may cause problems in that free low molecular weight compounds, such as cyclic trimer, increase and a film is colored yellow and the like.

When the porous polyester film of the present invention is used as an insulating material for electric motors, a polyester resin is preferably used, which is obtained from an aromatic dicarboxylic acid or an ester-forming derivative thereof and ethylene glycol as main starting materials, by the use of a Ge compound and/or a Ti compound as catalyst(s). In this case, intrinsic viscosity is preferably within the range of 0.68 dl/g–1.0 dl/g, particularly preferably the range of 0.68 dl/g–0.90 dl/g. When the intrinsic viscosity is less than 0.68 dl/g, the strength may undesirably become strikingly low during an extended period of use at high temperature as an insulating material for electric motors. When the intrinsic viscosity exceeds 1.0 dl/g, a load on an extruder and filtering pressure become noticeably high during the melt extrusion forming step of the polymer, which gives rise to the necessary limitation on the delivery amount of the polymer. As a result, the residence time in the melt line becomes longer to allow precipitation of cyclic trimer in a large amount, thus causing low reliability of motor due to release of cyclic trimer toward the electric motor system.

Moreover, when the porous polyester film of the present invention is used as an insulating material for electric motors, the polyester resin preferably has a cyclic trimer content of not more than 0.5 wt %, more preferably not more than 0.4 wt %, of the weight of the whole film. When the cyclic trimer content of the polyester resin exceeds 0.5 wt % of the weight of the whole film, the release of cyclic trimer toward an electric motor system radically increases to unbeneficially impair reliability of the motor.

When the porous polyester film of the present invention is used as an insulating material for electric motors, the polyester resin preferably shows an increase in the cyclic trimer content of not more than 0.5 wt %, more preferably not more than 0.2 wt %, upon melting at 290° C. for 60 minutes. When the increase in the amount of the cyclic trimer exceeds 0.5 wt %, precipitation of cyclic trimer increases during a melt extrusion-forming step of the polymer. This is not preferable because adjustment of the cyclic trimer content of the polyester resin relative to the weight of the whole film to not more than 0.5 wt % may become difficult. An increase in the amount of the cyclic trimer is measured by the method to be mentioned later.

The polyester resin having the aforementioned properties can be produced by the following method. That is, polyester chips are subjected to contact treatment with water in a treatment tank. The method of the contact treatment may involve immersion in water. The time of contact treatment with water is 5 min to 2 days, preferably 10 min to 1 day, more preferably 30 min to 10 hr, and the temperature of water is 20–180° C., preferably 40–150° C., more preferably 50–120° C.

In the porous polyester film of the present invention, voids are formed by mixing a polyester resin with a thermoplastic resin incompatible with the polyester resin to allow for dispersion of the incompatible thermoplastic resin into particles in the polyester resin and stretching, thereby forming the voids in the interface between the dispersed particles and the polyester resin.

The incompatible thermoplastic resin to be used in the present invention essentially contains a polyolefin resin. Other components such as polystyrene resin, polyacrylic resin, polycarbonate resin, polysulfonic resin, cellulose resin, polyphenylene ether resin and the like may be contained. Examples of the polyolefin resin include polyethylene, polypropylene, polymethylpentene, product obtained by ring-opening polymerization of cyclic olefin, a copolymer of cyclic olefin and other olefin, and the like.

While the incompatible thermoplastic resin content varies depending on the desired amount of voids, it is preferably 3–20 wt %, more preferably 5–18 wt % in the film. When the content is less than 3 wt %, the amount of formable voids cannot be increased beyond a certain level, and therefore, the properties (e.g., cushioning property, low dielectric property and light weight) derived from a porous structure may not be expressed. When it exceeds 20 wt %, the properties inherently possessed by the polyester resin, such as stretchability of a film, heat resistance, strength, rigidity and the like may be impaired.

In a particularly preferable embodiment, a polystyrene resin and a polyolefin resin are used at a specific ratio, namely, a polystyrene resin/polyolefin resin ratio of 0.01–1, wherein polymethylpentene and polypropylene are preferably used as the polyolefin resin, namely, a polystyrene resin, polymethylpentene and polypropylene are preferably used in combination.

In the present invention, the polystyrene resin is a thermoplastic resin containing a polystyrene structure as a basic constituent element, and is exemplified by a homopolymer (e.g., atactic polystyrene, syndiotactic polystyrene, isotactic polystyrene and the like), a modified resin obtained by graft- or block-copolymerization with other components (e.g., high-impact strength polystyrene, graft copolymer of polystyrene and polyphenylene ether and the like), a mixture with a thermoplastic resin compatible with these polystyrene resins (e.g., polyphenylene ether) and the like.

In the present invention, polymethylpentene is a polymer containing a unit derived from 4-methylpentene-1 in a proportion of not less than 80 mol %, preferably not less than 90 mol %. Examples of other unit include ethylene unit, propylene unit, butene-1 unit, 3-methylbutene-1 unit and the like.

In the present invention, polypropylene may be a homopolymer, such as isotactic polypropylene, syndiotactic polypropylene and the like, or a modified resin obtained by graft- or block-copolymerization with other components. The above-mentioned polypropylene resin may be used in the state where it has been copolymerized in the above-mentioned polymethylpentene, or a propylene unit has been introduced as a copolymerizable unit.

These resins are preferably used upon mixing at a specific ratio. Particularly preferably, a polystyrene resin content (a wt %), a polymethylpentene content (b wt %) and a polypropylene content (c wt %) in a film satisfy the following formulas:

$$0.01 \leq a/(b+c) \leq 1 c/b \leq 1$$

$$3 \leq a+b+c \leq 20$$

When a/(b+c) is less than 0.01, a dispersing effect based on the polystyrene resin relative to the polyolefin (polymethylpentene and/or polypropylene) becomes unstable, and the film may suffer from inconsistent dispersion and poor flexibility that can disadvantageously cause low handling property. Conversely, when a/(b+c) exceeds 1, the amount of formable void cannot be increased beyond a certain level, and therefore, the properties (e.g., low dielectric property, cushioning property, light weight) derived from the porous structure may not be expressed. The upper limit of a/(b+c) is particularly preferably 0.5, and the lower limit thereof is particularly preferably 0.1.

Similarly, when c/b exceeds 1, an increase in the amount of formable void is limited. The lower limit of c/b is not particularly limited, but when it is less than 0.01, the film may suffer from inconsistent dispersion and poor flexibility that can disadvantageously cause low handling property. The upper limit of c/b is particularly preferably 0.5, and the lower limit thereof is particularly preferably 0.1.

When a+b+c is less than 3 wt %, the amount of formable void cannot be increased beyond a certain level, and therefore, the properties (e.g., low dielectric property, cushioning property, light weight) derived from the porous structure may not be expressed. When a+b+c exceeds 20 wt %, the properties inherently possessed by a polyester resin (e.g., stretchability of a film, heat resistance, strength, rigidity and the like) may be impaired, which can undesirably cause low handling property. The upper limit of a+b+c is particularly preferably 18 wt %, and the lower limit thereof is particularly preferably 5 wt %.

For an improved opacifying property and the like, the porous polyester film of the present invention may contain inorganic or organic particles as necessary. Usable particles include, but not particularly limited to, silica, kaolinite, talc, calcium carbonate, zeolite, alumina, barium sulfate, carbon black, zinc oxide, titanium oxide, zinc sulfide, organic white pigment and the like. These particles can be added in advance to a polyester resin and/or a thermoplastic resin incompatible with a polyester resin.

The porous polyester film of the present invention can be produced by any method and is subject to no particular limitation. For example, a mixture consisting of the aforementioned composition can be formed into a film to give an unoriented film, and thereafter stretching this film, the inventive film is produced.

The conditions under which an unoriented film is stretched and oriented are closely related to the formation of voids. A sequential biaxial orientation method most preferably used, particularly a method comprising stretching an unoriented film in a longitudinal direction and then in the transverse direction, is taken as an example, and conditions for the stretching and orientation are explained in the following. In the first longitudinal stretching step, the film is stretched between two or more rolls having different speeds. The heating means in this step may involve use of a heating roll or non-contact heating or both in combination. For a great number of voids to be formed in the interface between a polyester resin and a thermoplastic resin incompatible with the polyester resin, the stretching temperature is set to not more than [second-order transition temperature Tg of polyester resin] +50° C. and the film is stretched 3 to 5 fold. The uniaxially oriented film is introduced into a tenter and stretched 2.5 to 5 fold in the transverse direction at not more than [melting point Tm of polyester resin] −10° C.

The biaxially oriented film thus obtained is subjected to a heat treatment as necessary. The heat treatment is preferably performed in a tenter at from [melting point Tm of polyester resin] −50° C. to Tm.

The porous polyester film of the present invention may have a single layer or a multi-layer structure consisting of the same or different kinds of synthetic resin film layers. The synthetic resin film layers used in combination can be obtained by coextrusion, coating or laminating with an adhesive and the like.

The synthetic resin film may be, but not limited to, a film comprising one or more kinds of polyethylene terephthalate, polyethylene naphthalate, polyphenylene sulfide, polyarylate and polyimide as main component(s).

The aforementioned synthetic resin film layer may contain a coloring agent, a light-proof agent, a fluorescent agent, an antistatic and the like, where necessary. The aforementioned inorganic particles and organic particles may be added.

The porous polyester film of the present invention may have a coating layer on at least one side thereof. By forming a coating layer, the wettability and adhesive property of ink, coating agent and the like can be improved. The compound constituting the coating layer is preferably a polyester resin. Besides, a compound disclosed to improve adhesive property of an ordinary polyester film, such as polyurethane resin, polyester urethane resin, acrylic resin and the like, can be applied.

The coating layer can be formed by a conventional method, such as gravure coat method, kiss coat method, dip coat method, spray coat method, curtain coat method, air knife coat method, blade coat method, reverse roll coat method and the like. The coating step may be applied before stretching of a film, after longitudinal stretching, after transverse stretching and the like.

The porous polyester film thus obtained has superior properties (e.g., cushioning property, low dielectric property and light weight) derived from a porous structure, as well as fine handling property.

The porous polyester film of the present invention has an apparent specific gravity of not more than 1.3, preferably not more than 1.2, more preferably not more than 1.15. When the apparent specific gravity is greater than 1.3, the amount of voids present in the film is too small to have sufficient properties (e.g., cushioning property, low dielectric property and light weight) derived from a porous structure. While the lower limit of the apparent specific gravity is not particularly limited, when the apparent specific gravity is below 0.8, the buckling radius r to be mentioned later cannot be made to fall within the preferable range and good handling property may not, be obtained. In the present invention, the amount of the incompatible thermoplastic resin is appropriately adjusted, or the combination of the incompatible thermoplastic resin inclusive of polyolefin resin is appropriately adjusted, or the conditions (e.g., stretching ratio, stretching temperature, heat treatment temperature and the like) of production of a film are appropriately determined, to make the apparent specific gravity not more than 1.3.

The porous polyester film of the present invention has an average size d of dispersed particles (unit:$\mu$m) of polyolefin resin of not more than 15 $\mu$m, preferably not more than 10 $\mu$m. In a film having an average size d of dispersed particles of the polyolefin resin of beyond 15 $\mu$m, dispersed particles have become coarse, and the film has a poor flexibility, and therefore, poor handling property. In the present invention, by the average size d of dispersed particles of polyolefin resin is meant the average of the maximum size of the dispersed particles. In the present invention, the average size d of dispersed particles of polyolefin resin can be set to not more than 15 $\mu$m by using a polystyrene resin with a polyolefin resin, or by appropriately determining the mixing ratio of the polyolefin resin and the polystyrene resin (a greater ratio of the polystyrene resin can make d smaller), or by controlling the shear history applied to a polymer in the melt line during the production of the film (application of a greater shear for a longer time results in smaller d) or other method.

The porous polyester film of the present invention has a ring crush strength G (unit:kg/mm) and a film thickness t (unit:mm), which satisfy the following formula:

$$G > 15 \times t^3$$

In the present invention, the ring crush strength G is defined by the method disclosed in the following example. When G is not more than $15 \times t^3$, the rigidity that the polyester film inherently has is impaired, and improvement of mounting property by a machine, resistance to buckling under loading and the like become poor, thus failing to achieve a good handling property. In the present invention, G is preferably not less than $20 \times t^3$. In the present invention, ring crush strength G and film thickness t can satisfy the above-mentioned formula by using a polystyrene resin and a polyolefin resin at a specific ratio, namely, polystyrene resin/polyolefin resin =0.01–1. To be specific, polymethylpentene and polypropylene are used as the polyolefin resin, and as mentioned above, the polystyrene resin content (a wt %), polymethylpentene content (b wt %) and polypropylene content (c wt %) of a film particularly preferably satisfy the following formulas:

$$0.01 \leq a/(b+c) \leq 1 c/b \leq 1$$

$$3 \leq a+b+c \leq 20$$

It is only when the porous polyester film of the present invention satisfies all of the above-mentioned requirements (a) to (c), namely, (a) apparent specific gravity of not more than 1.3, (b) average size d of dispersed particles of polyolefin resin of not more than 15 μm, and (c) ring crush strength G (unit:kg/mm) and film thickness t (unit:mm) satisfying the above-mentioned formulas, that a porous polyester film having superior properties (e.g., cushioning property, low dielectric property and light weight) derived from a porous structure while retaining good handling property can be obtained. When even a single requirement is not satisfied, a porous polyester film having superior properties (e.g., cushioning property, low dielectric property and light weight) derived from a porous structure while retaining good handling property cannot be obtained.

The porous polyester film of the present invention preferably has an aspect ratio of incompatible thermoplastic resin dispersed into particles in a section parallel to the longitudinal direction of the film of 1–10, more preferably 2–8. When the aspect ratio exceeds 10, a less amount of voids can be formed and adjustment of an apparent specific gravity to the above-mentioned range is difficult. In the present invention, by the aspect ratio is meant an average of (longer diameter/shorter diameter of incompatible thermoplastic resin dispersed into particles). In the present invention, the aspect ratio can be adjusted to 1–10 by using plural polyolefin resins having different melting point or glass transition point in an appropriate combination, or by appropriately determining a mixing ratio of a polyolefin resin and a polystyrene resin, or by appropriately determining the heat treatment temperature in the production conditions of a film (a heat treatment at a higher temperature results in a greater aspect ratio) or by other method.

Furthermore, the porous polyester film of the present invention preferably has a buckling radius r (unit:mm) and a film thickness t (unit:mm) that satisfy the following formula:

$$r < 25 \times t$$

In the present invention, the buckling radius r is defined by the method described in the following example. When the buckling radius r is not less than 25×t, the rigidity that the polyester film inherently has is impaired and improvement in mountability by a machine, resistance to buckling under loading and the like become inferior, which may prevent good handling property from being achieved. In the present invention, buckling radius r is more preferably less than 20×t. In the present invention, the buckling radius r and film thickness t can satisfy the above-mentioned formulas by a method similar to the aforementioned method employed to adjust the average size d of dispersed particles of polyolefin resin to not more than 15 μm, which includes using a polystyrene resin with a polyolefin resin, or by appropriately setting the mixing ratio of the polyolefin resin and polystyrene resin (a greater ratio of the polystyrene resin can make r smaller), or by controlling the shear history applied to a polymer in the melt line during the production of the film (application of a greater shear for a longer time results in smaller r) or other method.

The porous polyester film of the present invention preferably has a dielectric constant of less than 2.9, more preferably not more than 2.7, most preferably not more than 2.6. When the dielectric constant is not less than 2.9, suppressive effect on current leakage (a decrease of current leakage to a current leakage in a standard PET film) may become insufficient, when the film is used as an electric insulating material. In the present invention, the apparent specific gravity of the film needs to be not more than 1.3 to make the dielectric constant less than 2.9.

The porous polyester film of the present invention can be particularly useful as an electric insulating material (e.g., insulating material for electric motor, particularly for hermetic motors), printing film (e.g., for heat transfer) and the like.

The porous polyester film of the present invention does not require a surfactant, polyalkylene glycol, polyether resin and the like as a dispersing agent of a polyolefin resin, and therefore, shows superior heat resistance, smaller difference in hue even upon recycled use of self-reclaimed resin as a starting material, and superior stability during film production. The preferably ratio of use in the case of recycled use of the self-reclaimed resin is 5–50 wt %.

The porous polyester film of the present permits the use of a polymer reclaimed from PET bottles and a polymer reclaimed from magnetic card, IC card and the like.

The present invention is explained in more detail in the following by way of Examples and Comparative Examples, to which the present invention is not limited. The measurement methods and evaluation methods used in the present invention are shown in the following.

1) Apparent Specific Gravity

Measured in accordance with JIS K-7112 sink float method.

2) Average Size d of Dispersed Particles of Polyolefin Resin

A film (1.0 g) was finely cut, placed in a 50 ml measuring flask, and hexafluoroisopropanol heated to 40° C. was added. The flask was heated at 40° C. for 2 hr to dissolve the film. The solution was passed through a 0.45 μm membrane filter and undissolved matter (polyolefin resin particles) was taken out. The particles were dried, from which 20 points were randomly selected and magnified 1500 fold with a scanning electron microscope (SEM). The maximum size of the respective particles was measured, and the average was taken as d.

3) Aspect Ratio of Incompatible Thermoplastic Resin Dispersed into Particles

A film was cut in a direction parallel to the longitudinal direction and the section was exposed with a microtome.

Fifty dispersed particles of an incompatible thermoplastic resin were randomly selected and optionally magnified 300–1000 fold with a scanning electron microscope (SEM). A longer diameter/shorter diameter ratio of each of the dispersed particles was measured. The average was taken as an aspect ratio.

4) Buckling Radius r (Unit:mm)

A film was cut to give two pieces (10 mm×100 mm) each from the longitudinal direction and the transverse direction. Using vernier calipers having a bill having a length of not less than 50 mm, the film was lightly bent and inserted between the mandibles of the vernier calipers in a U-shape, and the distance between the mandibles was shortened in the direction of smashing the film. When the film, unable to stand the bending, was buckled forming an angle, the distance between the mandibles was read on a scale of the vernier calipers and half the value was taken as the buckling radius r (unit :mm) of the film. The value was an average of 4 samples.

5) Ring Crush Strength G

The compressive strength test method (ring crush method) for cardboard described in JIS P-8126 was used.

Tester used: Universal compression/tensile tester manufactured by Toyo Baldwin Co., Ltd. Using a load cell at full scale 100 kg, stress was read. Compressed at test speed 13 mm/min.

Test sample support device: A stainless jig shown in JIS P-8126 was used which had a groove (diameter of 50 mm, groove depth 6.35 mm).

Test piece: A film was cut to give two pieces (152.4 mm×12.07 mm) each from the longitudinal direction and the transverse direction.

Measurement method: The test pieces were inserted into a test piece holder, and the holder was applied to the tester for compression at a test speed of 13 mm/min while measuring the stress. The stress immediately before occurrence of buckling of the test piece was measured. This value was divided by the length of the test piece (152.4 mm) to give a ring crush strength G (unit kg/mm). The value was an average of 4 points.

6) Thickness t of Film

Using Digital Micrometer M-30 manufactured by Sony Precision Technology Inc., the thickness of the film was measured at 20 points randomly selected. The average was taken as the thickness t (mm) of the film.

7) Handling Property of Film—1 (Mountability on the Insulating Part of Low Voltage Induction Electric Motor Slot)

Figure 1:
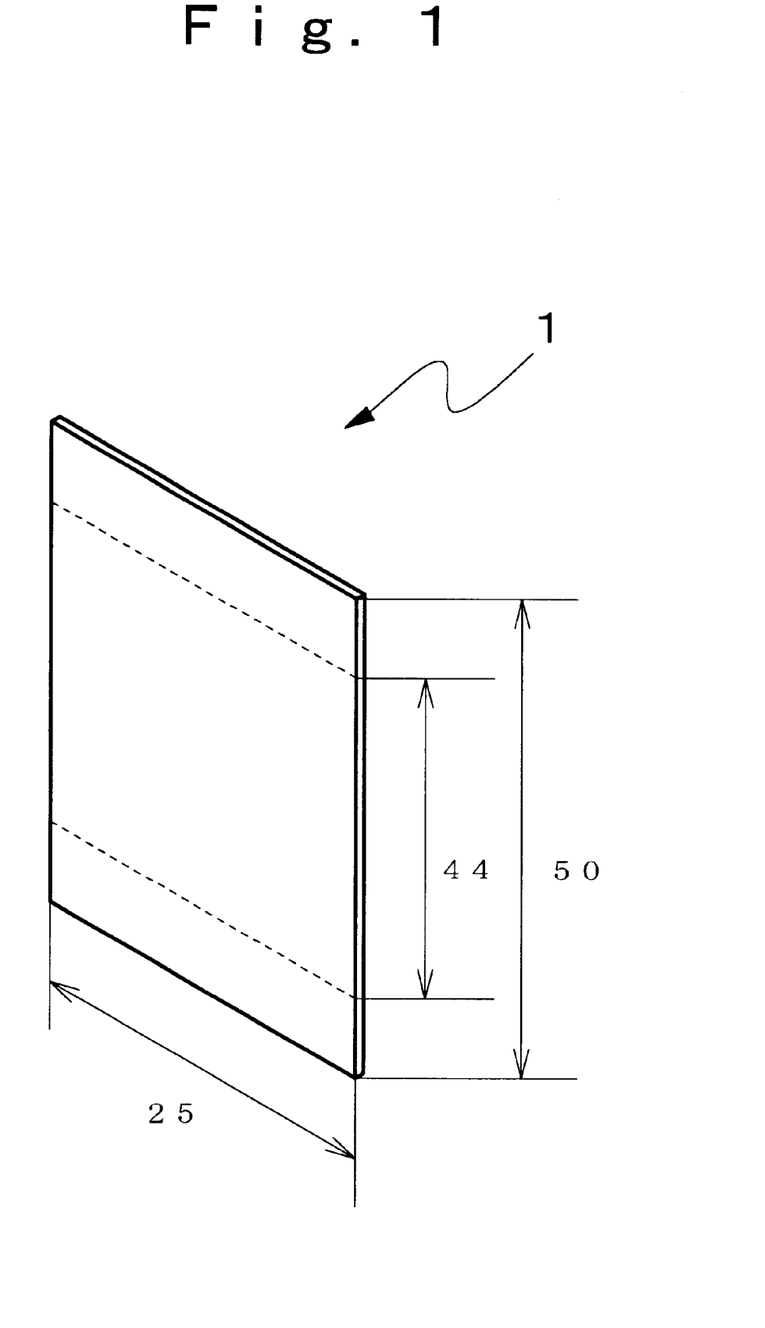
FIG. 1 shows a cut film wherein a broken line is a line along which the film is to be folded, wherein 1 is the film and other numerals are in the unit of mm.
Figure 2:
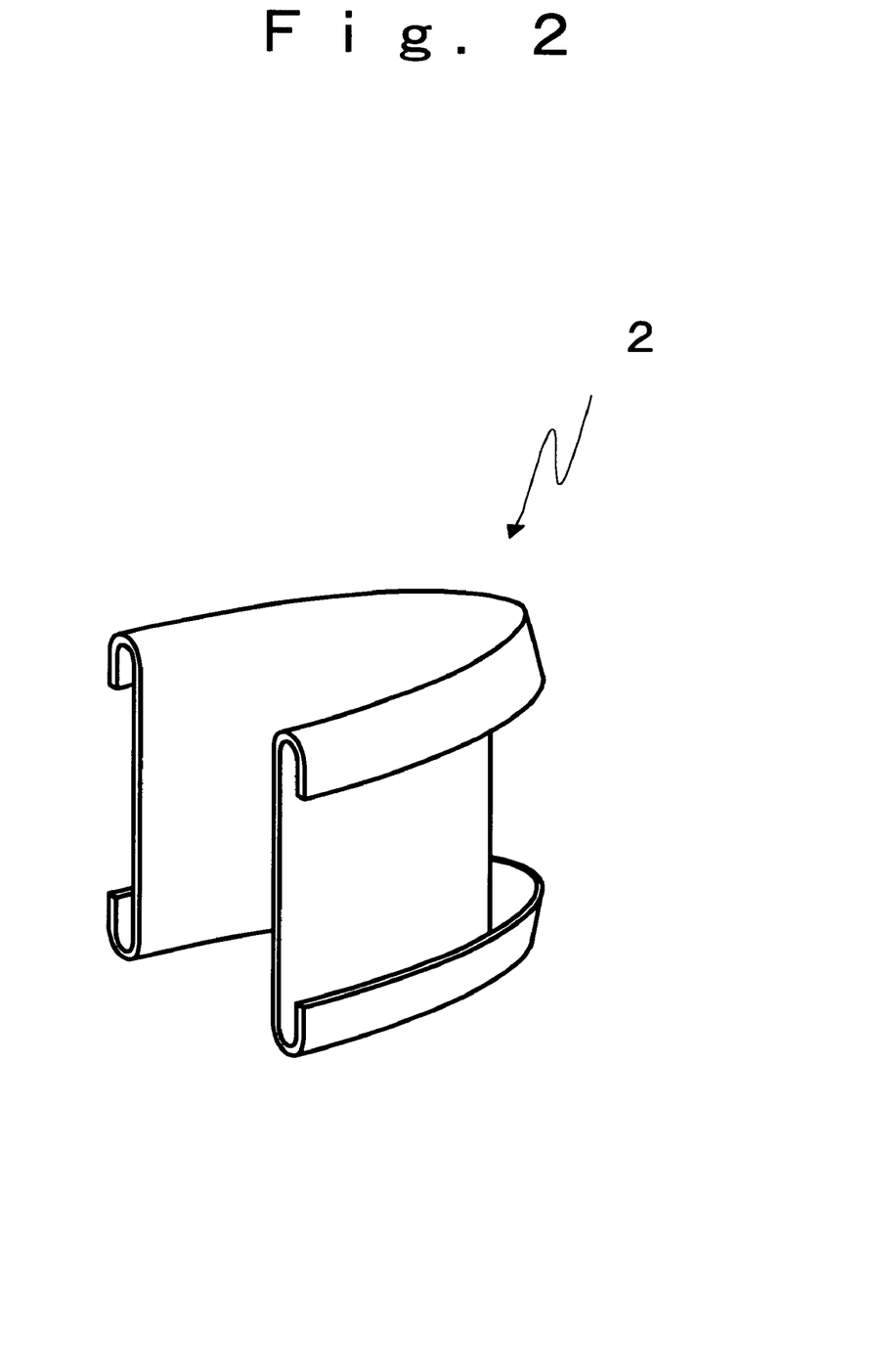
FIG. 2 shows the film of FIG. 1 folded along the broken line and bent to form a U-shape, wherein 2 is the U-shaped film.
Figure 3:
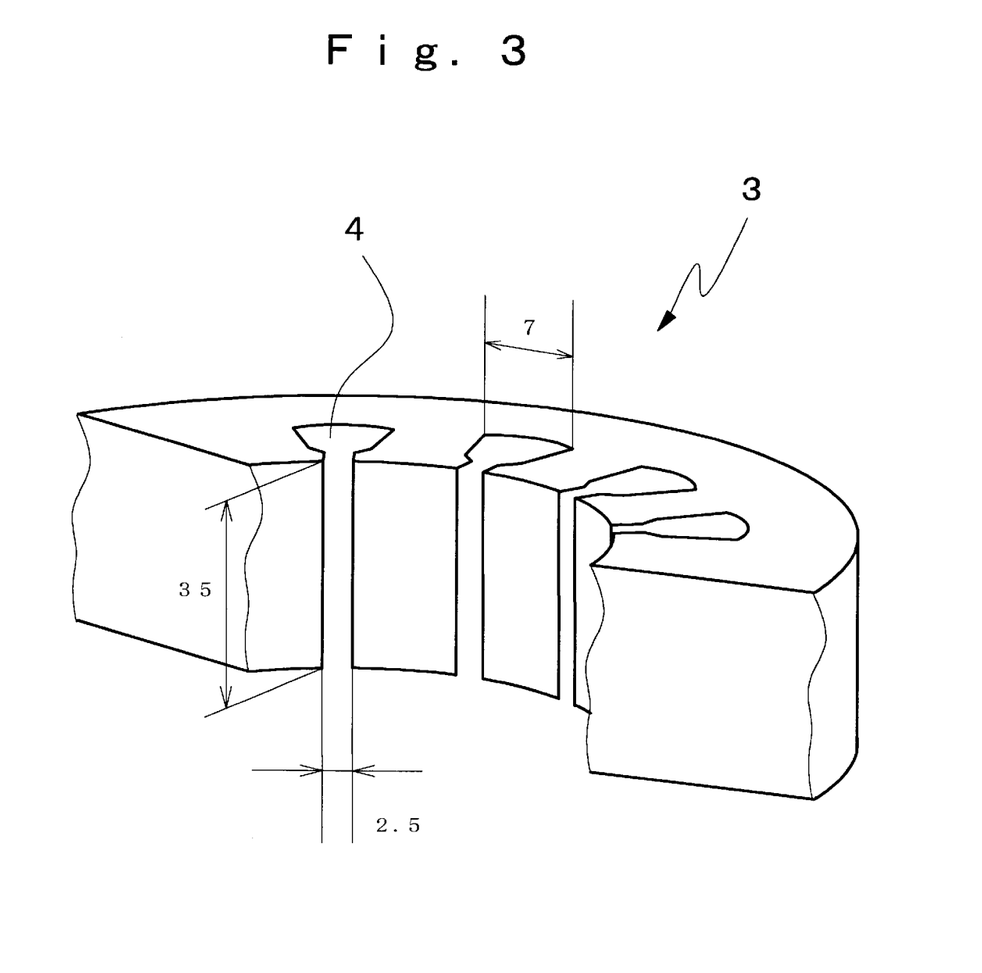
FIG. 3 shows a motor slot model, in which the film of FIG. 2 is to be inserted, wherein 3 is the model partially broken away, 4 is a part into which a film is inserted and other numerals are in the unit of mm.

Each sample was cut into 100 sheets having the size shown in FIG. 1, bent in the shape shown in FIG. 2 and inserted into the film insertion part 4 of the motor slot model 3 shown in FIG. 3 to evaluate the mountability. The evaluation criteria were as follows.

∘: No insertion failure due to crushing and buckling in 100 sheets.

Δ: Less than 5 times of insertion failure due to crushing and buckling in 100 sheets.

X: Not less than 5 times of insertion failure due to crushing and buckling in 100 sheets.

8) Handling Property of Film—2 (Transportability of Cut Sheets)

After antistatic and anti-blocking processing on the surface of the film, 100 sheets of samples cut into A6 postcard size were prepared. These samples were applied to an offset printer (manufactured by Texel AR-010) to perform a transport test. The handling property was evaluated based on the frequency of failure in being transported due to buckling, wrinkles, jamming and the like.

∘: No occurrence of transport failure in 100 sheets.

Δ: Less than 5 times of transport failure in 100 sheets.

X: Not less than 5 times of transport failure in 100 sheets.

9) Dielectric Constant

Measured according to JIS C 2151–1990 "electric plastic film test method".

10) Heat Transfer Sensitivity

A coating solution having the following composition was applied to a film surface, so that the weight after drying became 4 g/m$^2$, fixed and heated at 160° C. for 30 seconds to form a recording layer, whereby a heat transfer image-receiving sheet was prepared.

Water dispersible copoymerized polyester resin: 2 parts by weight

Water dispersible acrylic-styrene copoymerized resin: 5 parts by weight

Water dispersible isocyanate crosslinking agent: 0.5 part by weight

Water: 67.4 parts by weight

Isopropyl alcohol: 25 parts by weight

Surfactant: 0.1 part by weight

Using a commercially available ink ribbon (attached to printing set P-PS100 for sublimation transfer printer manufactured by Caravelle Data Systems Co., Ltd.) and a commercially available heat transfer printer (heat transfer label printer BLP-323 manufactured by Bon Electric Co., Ltd.), the heat transfer image-receiving sheet cut into an A6 size was printed at printing speed of 100 mm/sec and head voltage of 18 V. The printing patterns agree in four colors of C (Cyan), M (magenta), Y (yellow) and K (black) which can be created by printing the others over one another. Seven 9 mm×9 mm square Characters for each color are arranged on an A6 sheet, the number of Characters totaling 28.

After printing, optical reflection density of each of C, M, Y and K colors was determined using Macbeth densitometer (TR-927) and an average optical reflection density of the four colors (total 28 sites) was determined. In the same manner as above, an average optical reflection density was determined for a commercially available image-receiving paper attached to the above-mentioned printing set. The image-receiving paper comprises foamed polypropylene films laminated on both sides of a natural paper to form recording layers. The heat transfer sensitivity is evaluated based on the proportion (%) of the average optical reflection density of the sample relative to the average optical reflection density of the commercially available image-receiving paper.

12) Intrinsic Viscosity (IV) of Polyester Resin

Measured from the solution viscosity of a mixed solvent of 1,1,2,2-tetrachloroethane/phenol (2:3 weight ratio) at 30° C.

13) Cyclic Trimer Content (Hereinafter to be Referred to as a CT Content) of Polyester Resin Sample (300 mg) was dissolved in a hexafluoroisopropanol/chloroform mixed solution (3 ml, volume ratio=2/3) and more chloroform (30 ml) was added for dilution. Methanol (15 ml) was added to precipitate the polymer and filtered. The filtrate was evaporated to dryness, adjusted to a constant volume with dimethylformamide (10 ml) and cyclic trimer was quantified by high performance liquid chromatography.

14) Increase in Cyclic Trimer Content(ΔCT) Due to Molten Polyester Resin

Dry polyester chips (3 g) were placed in a glass test tube and melted by immersing the test tube in an oil bath at 290° C. for 60 min under a nitrogen atmosphere. The increase in cyclic trimer content upon melting was calculated from the following formula:

Increase in cyclic trimer content (wt %) upon melting=Cyclic trimer content (wt %) of polyester after melting−Cyclic trimer content (wt %) of polyester before melting 15) Retention of Elongation The refrigerant used was HFC-134a ($CH_2F$—$CF_3$)(20 g) and the lubricant used was POE (polyol ester) synthetic oil (50 g). The test sample was placed in a 120 cc autoclave at 140° C., 30 atm for 2000 hours. Prior to casting of the refrigerant and lubricant, the sample to be measured was subjected to dehydration treatment in an autoclave at 140° C. in 26Pa (0.2 Torr) vacuo for 3 hours. The lubricant had been controlled to have a moisture content of 300 ppm by drying and adjusting humidity before use.

The elongation at break was measured before and after the aforementioned test, and evaluated by the ratio (retention) of elongation at break of sample after test to elongation at break of sample before test. The elongation at break was measured according to the method defined in JIS-C2318.

16) Decrease in Current Leakage

Using HFC-134a as refrigerant and POE oil as lubricant were used in combination. A standard electric insulating PET film was inserted into the motor of a concealed type compressor for refrigerator, and the initial value ($X_1$) of current leakage was measured. Then, the sample was inserted instead of the standard electric insulating PET film, and the initial value ($X_2$) of current leakage of the sample was measured. A decrease in the current leakage was calculated from the following formula.

Decrease in current leakage (%)=$[1-(X_2/X_1)]\times 100$

EXAMPLE 1

Preparation of Void-Forming Agent

Polyethylene terephthalate pellets (70 wt %) having an intrinsic viscosity of 0.62 dl/g, polystyrene pellets (6 wt %, TOPOREX 570-57U, manufactured by MITSUI TOATSU CHEMICALS, INC.) having a melt flow rate of 2.0, polypropylene pellets (6 wt %, NOBLEN FO-50F, manufactured by MITSUI TOATSU CHEMICALS, INC.) having a melt flow rate of 1.7, and polymethylpentene pellets (18 wt %, TPX, DX-845, manufactured by MITSUI PETROCHEMICAL INDUSTRIES, LTD.) having a melt flow rate of 8 were mixed and supplied to a twin-screw extruder. The mixture was thoroughly kneaded and extruded. Strands were cooled and cut to give master pellets (Pa) containing avoid-forming agent. Polyethylene terephthalate (75 wt %) having an intrinsic viscosity of 0.62 dl/g and the above-mentioned master pellets (Pa, 25 wt %) were mixed and dried in vacuo to give a starting material of a film.

Preparation of Unoriented Film

The above-mentioned starting material of a film was supplied to an extruder, and extruded on a cooling drum adjusted to 30° C. using a T die to give an unoriented film having a thickness of about 1900 μm.

Preparation of Biaxially Oriented Film

The obtained unoriented film was uniformly heated to 65° C. with a heating roll, and drawn 3.4 times between two pairs of nip rolls having different rolling speeds (rate of lower speed roll=1 m/min, rate of higher speed roll=3.4 m/min). As auxiliary heating device for the film, infrared heaters (standard 20 W/cm) equipped with a gold reflecting film were set at the center in between the nip rolls and facing the films at 1 cm distance from the film surface. The monoaxially stretched film thus obtained was led to a tenter, heated to 150° C. and transversely stretched 3.7 times. The film was transversely tentered, heated at 220° C. for 5 seconds and relaxed by 4% in the transverse direction at 210° C. to give a porous polyester film (Example 1) having a thickness of 188

Comparative Example 1

In the same manner as in Example 1 except that the starting material was a mixture of polyethylene terephthalate (90 wt %) upon drying in vacuo having an intrinsic viscosity of 0.62 dl/g, and polystyrene (10 wt %, TOPOREX 570-57U, manufactured by MITSUI TOATSU CHEMICALS, INC.) having a melt flow rate of 2.0, a porous polyester film (Comparative Example 1) was obtained.

Comparative Example 2

In the same manner as in Example 1 except that the starting material was a mixture of polyethylene terephthalate (90 wt %) upon drying in vacuo having an intrinsic viscosity of 0.62 dl/g, and polypropylene (10 wt %, NOBLEN FO-50F, manufactured by MITSUI TOATSU CHEMICALS, INC.) having a melt flow rate of 1.7, a porous polyester film (Comparative Example 2) was obtained.

Comparative Example 3

In the same manner as in Example 1 except that the starting material was a mixture of polyethylene terephthalate (83 wt %) upon drying in vacuo having an intrinsic viscosity of 0.62 dl/g, polymethylpentene chips (7 wt %, TPX, DX-820, manufactured by MITSUI PETROCHEMICAL INDUSTRIES, LTD.) having a melt flow rate of 180 and polyethylene glycol flakes (10 wt %) having a molecular weight of 4000, a porous polyester film (Comparative Example 3) was obtained.

EXAMPLE 2

A mixture (starting material) of polyethylene terephthalate (49.5 wt %) having an intrinsic viscosity of 0.62 dl/g, anatase titanium dioxide (50 wt %, TA-300, manufactured by Fuji Titanium Inc.) having an average particle size of 0.3 μm (electron microscope method) and a fluorescent brightener (0.5 wt %, OB-1 manufactured by Eastman) was fed into a vent type twin-screw extruder and pre-kneaded. The molten polymer was continuously fed into a vent type single-screw extruder and kneaded to give master pellets (Pb) containing fine particles of titanium oxide. The master pellets (Pa, 30 wt %) containing the void-forming agent prepared in Example 1, master pellets (Pb, 5 wt %) containing the aforementioned fine particles and polyethylene terephthalate (65 wt %) having an intrinsic viscosity of 0.64 dl/g were mixed and dried in vacuo to give a starting material (A) of the film. The master pellets (Pb, 50 wt %) containing fine particles and polyethylene terephthalate (50 wt %) having an intrinsic viscosity of 0.64 dl/g were mixed and dried in vacuo to give a starting material (B) of the film.

These starting materials (A) and (B) were fed into different extruders and the layers of the starting material (B) were uniformly laminated (B/A/B=5/90/5) on the both surfaces of the layer of the starting material (A) by the use of feed block, whereby an unoriented polyester film having a thickness of about 700 μm was obtained. In the same manner as in Example 1 except the rate of the lower speed roll=2 m/min and the rate of the higher speed roll=6.8 m/min, a porous polyester film (Example 2) having a thickness of 100 μm was obtained.

Comparative Example 4

Polyethylene terephthalate (80 wt %) having an intrinsic viscosity of 0.62 dl/g and the master pellets (Pb, 10 wt %) containing fine particles prepared in Example 2 were mixed and dried in vacuo. Thereto was added polystyrene (10 wt %, TOPOREX 570-57U, manufactured by MITSUI TOATSU CHEMICALS, INC. ) having a melt flow rate of 2.0 to give a starting material of the film. In the same manner as in Example 1 except the rate of the lower speed roll=2 m/min and the rate of the higher speed roll=6.8 m/min, a porous polyester film (Comparative Example 4) having a thickness of 100 μm was obtained.

Comparative Example 5

A mixture of polyethylene terephthalate (78 wt %) having an intrinsic viscosity of 0.62 dl/g, and the master pellets (Pb, 10 wt %) containing the fine particles prepared in Example 2 were mixed and dried in vacuo. Thereto was added polypropylene (12 wt %, NOBLEN FO-50F, manufactured by MITSUI TOATSU CHEMICALS, INC.) having a melt flow rate of 1.7 and the mixture was used as the starting material of the film. In the same manner as in Example 1 except the rate of the lower speed roll=2 m/min and the rate of the higher speed roll=6.8 m/min, a porous polyester film (Comparative Example 5) having a thickness of 100 μm was obtained.

Comparative Example 6

As the starting material, a mixture of polyethylene terephthalate dried in vacuo (80 wt %) having an intrinsic viscosity of 0.62 dl/g, polymethylpentene chips (10 wt %, TPX, DX-820, manufactured by MITSUI PETROCHEMICAL INDUSTRIES, LTD.) having a melt flow rate of 180 and polyethylene glycol flakes (10 wt %) having a molecular weight of 4000 was used. In the same manner as in Example 1 except the rate of the lower speed roll=2 m/min and the rate of the higher speed roll=6.8 m/min, a porous polyester film (Comparative Example 6) having a thickness of 100 μm was obtained.

EXAMPLE 3

Preparation of Void-forming Agent

As the starting material, polystyrene pellets (20 wt %, TOPOREX 570-57U, manufactured by MITSUI PETROCHEMICAL INDUSTRIES, LTD.) having a melt flow rate of 2.0, polypropylene pellets (20 wt %, NOBLEN FO-50F, manufactured by MITSUI TOATSU CHEMICALS, INC.) having a melt flow rate of 1.7, and polymethylpentene pellets (60 wt %, TPX, DX-820, manufactured by MITSUI PETROCHEMICAL INDUSTRIES, LTD.) having a melt flow rate of 180 were mixed and fed to a twin-screw extruder. The mixture was thoroughly kneaded and extruded. Strands were cooled and cut to give master pellets (Pc) containing a void-forming agent.

Production of Film

Then, a polyethylene terephthalate pellets (90 wt %) prepared using an Sb catalyst and having an intrinsic viscosity of 0.62 dl/g, and the aforementioned master pellets (Pc, 10 wt %) containing the void-forming agent were mixed and dried in vacuo to give a starting material (C) of a film.

A polyethylene terephthalate alone prepared using an Sb catalyst and having an intrinsic viscosity of 0.62 dl/g was used as a starting material (D) of a film.

These starting materials (C) and (D) were fed into different extruders, melted at 290° C. and the layers of the starting material (D) were uniformly laminated (D/C/D=7.5/85/7.5) on the both surfaces of the layer of the starting material (C) by the use of feed block, whereby an unoriented polyester film having a thickness of about 2600 μm was obtained. The residence time of the molten resin from casting the starting material into the extruder to forming of the unoriented film was about 10 minutes. In the same manner as in Example 1, the above-mentioned unoriented film was stretched and heat treated to give a porous polyester film (Example 3) having a thickness of 250 μm and an apparent specific gravity of 1.05.

EXAMPLE 4

In the same manner as in Example 3 except that polyethylene terephthalate chips having an intrinsic viscosity of 0.75 dl/g, a cyclic trimer content of 0.30 wt % and ΔCT=0.6 wt %, which were prepared using a Ge catalyst, were used instead of the polyethylene terephthalate used in Example 3, a porous polyester film (Example 4) was obtained.

EXAMPLE 5

In the same manner as in Example 3 except that polyethylene terephthalate chips having an intrinsic viscosity of 0.75 dl/g, a cyclic trimer content of 0.30 wt % and ΔCT= 0.07 wt %, which were prepared by water treatment of the polyethylene terephthalate chips used in Example 4, were used instead of the polyethylene terephthalate used in Example 3, a porous polyester film (Example 5) was obtained.

TABLE 1

|  | Ex.1 | Com.Ex.1 | Com.Ex.2 | Com.Ex.3 | Ex.3 |
|---|---|---|---|---|---|
| Apparent specific gravity | 1.05 | 1.31 | 1.03 | 1.02 | 1.05 |
| Film thickness (mm) | 0.188 | 0.188 | 0.188 | 0.188 | 0.250 |
| Average size d of dispersed particles (μm) | 7.2 | — | 16.2 | 5.2 | 5.3 |
| Ring crush strength G (kg/mm) | 0.16 | 0.18 | 0.14 | 0.09 | 0.38 |
| $15 \times t^3$ | 0.10 | 0.10 | 0.10 | 0.10 | 0.23 |
| Aspect ratio | 3.9 | 11.3 | 8.7 | 2.8 | 2.9 |
| Buckling radius r (mm) | 2.5 | 1.0 | 5.0 | 3.0 | 3.8 |
| $25 \times t$ | 4.7 | 4.7 | 4.7 | 4.7 | 6.3 |
| Dielectric constant | 2.4 | 3.0 | 2.4 | 2.4 | 2.4 |
| Handling property (mountability) | ○ | ○ | X | X | ○ |

TABLE 2

|  | Ex.2 | Com.Ex.4 | Com.Ex.5 | Com.Ex.6 |
|---|---|---|---|---|
| Apparent specific gravity | 1.00 | 1.32 | 1.00 | 0.75 |
| Film thickness (mm) | 0.100 | 0.100 | 0.100 | 0.100 |
| Average size d of dispersed particles (μm) | 6.8 | — | 15.9 | 5.1 |
| Ring crush strength G (kg/mm) | 0.035 | 0.050 | 0.030 | 0.010 |
| $15 \times t^3$ | 0.015 | 0.015 | 0.015 | 0.015 |
| Aspect ratio | 3.8 | 11.5 | 9.1 | 2.8 |
| Buckling radius r (mm) | 1.8 | 0.8 | 3.0 | 3.0 |
| $25 \times t$ | 2.5 | 2.5 | 2.5 | 2.5 |
| Heat transfer sensitivity (%) | 95 | 78 | 89 | 89 |
| Handling property (transportability) | ○ | ○ | X | X |

TABLE 3

|  | Ex.4 | Ex.5 |
| --- | --- | --- |
| Apparent specific gravity | 1.06 | 1.06 |
| Film thickness (mm) | 0.250 | 0.250 |
| Average size d of dispersed particles ($\mu$m) | 5.2 | 5.2 |
| Ring crush strength G (kg/mm) | 0.35 | 0.38 |
| 15 × $t^3$ | 0.23 | 0.23 |
| Aspect ratio | 2.9 | 2.8 |
| Buckling radius r (mm) | 3.5 | 3.8 |
| 25 × t | 6.3 | 6.3 |
| Dielectric constant | 2.4 | 2.4 |
| Handling property (mountability) | ○ | ○ |
| Cyclic trimer content (wt %) | 0.42 | 0.31 |
| Retention of elongation (%) | 54 | 57 |
| Decrease in current leakage (%) | 23 | 22 |

The measurement results of the porous polyester films, which were obtained by the following methods, are shown in Tables 1 to 3. The results of Tables 1 to 3 reveal the following.

The films of Examples 1 to 5 satisfy the requirements of the present invention, and superior properties derived from the porous structure and good handling property can be achieved.

In contrast, the film of Comparative Example 1 having an apparent specific gravity which exceeds the level of the present invention showed higher dielectric constant. The film of Comparative Example 4 having an apparent specific gravity which exceeds the level of the present invention showed lower heat transfer sensitivity. Thus, both films fail to show superior properties derived from the porous structure.

The film of Comparative Example 2 having an average size d of dispersed particles of polyolefin resin which exceeds the level of the present invention showed and the film of Comparative Example 3 having a ring crush strength G which is outside the range defined in the present invention showed frequent defective insertion due to crushing and buckling during mountability test on the insulating part of a motor slot.

Similarly, the film of Comparative Example 5 having an average size d of dispersed particles of polyolefin resin which exceeds the level of the present invention showed and the film of Comparative Example 6 having a ring crush strength G which is outside the range defined in the present invention showed frequent defective transport during the transportability test of cut sheets.

From the foregoing explanation, it is clear that the porous polyester film of the present invention has superior properties derived from a porous structure (e.g., cushioning property, low dielectric property, light weight) and good handling property during post-processing, so that it is extremely useful as an electric insulating material (e.g., insulating material for electric motor), which is required to have low dielectric property and handling property (mountability and the like) and as a film for various printing applications, which is required to have cushioning property and handling property (smoothness in transport of film and the like).

This application is based on application No. 348973/1998 filed in Japan, the content of which is incorporated hereinto by reference.

What is claimed is:

1. A porous polyester film comprising a composition comprising a polyester resin and a thermoplastic resin incompatible with the polyester resin, and a number of voids formed by dispersing the incompatible thermoplastic resin to provide particles in the polyester resin and stretching same, wherein the incompatible thermoplastic resin comprises a polyolefin resin, and the film satisfies the following requirements (a) to (c):

(a) an apparent specific gravity of not more than 1.3;

(b) an average size d of dispersed particles of the polyolefin resin of not more than 15 $\mu$m; and (c) a ring crush strength G (unit:kg/mm) and a film thickness t (unit:mm) satisfying the following formula $$G > 15 \times t^3.$$

2. The porous polyester film of claim 1, wherein the dispersed particles of the incompatible thermoplastic resin have an aspect ratio of the section parallel to the longitudinal direction of the film of 1–10.

3. The porous polyester film of claim 1, having a buckling radius r (unit:mm) and a film thickness t (unit:mm), that satisfy the following formula:

$$r < 25 \times t.$$

4. The porous polyester film of claim 1, having a dielectric constant of less than 2.9.

5. The porous polyester film of claim 1, wherein the polyolefin resin is polymethylpentene, polypropylene, or polymethylpentene and polypropylene.

6. The porous polyester film of claim 5, further comprising
a polystyrene resin as the incompatible thermoplastic resin.

7. The porous polyester film of claim 6, wherein the film has a polystyrene resin content (a wt %), a polymethylpentene content (b wt %), and a polypropylene content (c wt %), which satisfy the following formulas:

$$0.01 \leq a/(b+c) \leq 1 c/b \leq 1$$

$$3 \leq a+b+c \leq 20.$$

8. The porous polyester film of claim 1, wherein the polyester resin has a cyclic trimer content of not more than 0.5 wt % of the whole weight of the film.

9. The porous polyester film of claim 8, which is used as an insulating material for an electric motor.

10. The porous polyester film of claim 8, wherein the polyester resin has an intrinsic viscosity of 0.68–1.0 dl/g.

11. The porous polyester film of claim 8, wherein the polyester resin shows an increase in the amount of a cyclic trimer of not more than 0.50 wt % upon melting at 290° C. for 60 minutes.

12. The porous polyester film of claim 8, wherein the polyester resin has been subjected to a water treatment in the state of chips after condensation polymerization, and the polyester resin is obtained mainly from an aromatic dicarboxylic acid or an ester-forming derivative thereof and ethylene glycol as starting materials and by the use of, as a catalyst, a Ge compound, a Ti compound, or a Ge compound and a Ti compound.

* * * * *

UNITED STATES PATENT AND TRADEMARK OFFICE
CERTIFICATE OF CORRECTION

PATENT NO. : 6,287,680 B1
DATED : September 11, 2001
INVENTOR(S) : Yasushi Sasaki et al.

It is certified that error appears in the above-identified patent and that said Letters Patent is hereby corrected as shown below:

<u>Title page,</u>
Item [73], Assignee, please change "Toyo Boseki Kabushiki Kaisha, Osaki (JP)" to
-- Toyo Boseki Kabushiki Kaisha, Osaka (JP) --

Signed and Sealed this

Eleventh Day of June, 2002

*Attest:*

*Attesting Officer*

JAMES E. ROGAN
*Director of the United States Patent and Trademark Office*